(12) United States Patent
Walawender et al.

(10) Patent No.: US 9,937,778 B2
(45) Date of Patent: Apr. 10, 2018

(54) WINDOW SEAL ASSEMBLY FOR LIMITING AIR LEAKS FROM A VEHICLE FRAME INTO A PASSENGER CABIN OF A VEHICLE

(71) Applicant: Ford Global Technologies, LLC, Dearborn, MI (US)

(72) Inventors: Chester Stanislaus Walawender, Livonia, MI (US); Fouad Hafiani, Ypsilanti, MI (US); Stephen Laczay, Allen Park, MI (US); Sheri Reck, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/070,135

(22) Filed: Mar. 15, 2016

(65) Prior Publication Data
US 2017/0267085 A1    Sep. 21, 2017

(51) Int. Cl.
*B60J 10/75* (2016.01)
*B60J 10/74* (2016.01)
*E06B 7/22* (2006.01)
*B60J 5/04* (2006.01)

(52) U.S. Cl.
CPC ............ *B60J 10/74* (2016.02); *B60J 5/0418* (2013.01); *B60J 10/75* (2016.02); *E06B 7/22* (2013.01)

(58) Field of Classification Search
CPC ................................ B60J 10/75; B60J 5/0418
See application file for complete search history.

(56) References Cited

U.S. PATENT DOCUMENTS

| | | | |
|---|---|---|---|
| 5,004,292 A * | 4/1991 | Horne | B60J 10/75 248/118 |
| 5,111,619 A | 5/1992 | Billin et al. | |
| 5,388,371 A | 2/1995 | Nozaki | |
| 6,966,601 B2 * | 11/2005 | Matsumoto | B60R 13/0206 296/146.2 |
| 7,536,830 B2 * | 5/2009 | Clark | B60J 10/32 296/146.7 |
| 7,547,059 B2 * | 6/2009 | Delaine | B60R 16/0222 174/152 G |
| 9,027,982 B2 * | 5/2015 | Ide | B60J 5/0402 296/146.2 |
| 9,156,335 B1 * | 10/2015 | Harter | E05B 81/76 |
| 9,434,242 B2 * | 9/2016 | Yamada | B60J 10/75 |
| 2004/0221514 A1 * | 11/2004 | Kohara | B60J 5/00 49/475.1 |

(Continued)

FOREIGN PATENT DOCUMENTS

| | | | | |
|---|---|---|---|---|
| CA | 2788160 A1 * | 8/2011 | ............ | B60J 10/235 |
| DE | 102015014819 A1 * | 5/2016 | ............ | B60J 5/0411 |

(Continued)

*Primary Examiner* — Gregory J Strimbu
*Assistant Examiner* — Marcus Menezes
(74) *Attorney, Agent, or Firm* — Jason Rogers; Price Heneveld LLP (57) ABSTRACT

A vehicle door sealing assembly includes a door trim panel and an inner frame panel defining a door cavity, a window positioned proximate the door trim panel and the inner frame panel, a beltline seal disposed between the door trim and inner frame panels and in selective engagement with the window and a leak seal extending between the door trim panel and the beltline seal to divert a flow of air from the door cavity.

11 Claims, 8 Drawing Sheets

(56) References Cited

U.S. PATENT DOCUMENTS

2013/0320705 A1* 12/2013 Okada .................. B60J 10/0091
                                                                                 296/146.2
2016/0001646 A1* 1/2016 Yamada .................. B60J 10/75
                                                                                  52/716.5

FOREIGN PATENT DOCUMENTS

| FR | 2718392 A1 * | 10/1995 | ............ B60J 10/265 |
| JP | 10100675 | 4/1998 | |
| JP | 2004074830 A * | 3/2004 | ......... B60R 13/0206 |
| JP | 2005289272 A * | 10/2005 | .............. B60J 10/75 |
| KR | 20110023204 | 3/2011 | |

* cited by examiner

WINDOW SEAL ASSEMBLY FOR LIMITING AIR LEAKS FROM A VEHICLE FRAME INTO A PASSENGER CABIN OF A VEHICLE

FIELD OF THE INVENTION

The present invention generally relates to a window seal system, more specifically, a window seal system that limits air leaks from entering the passenger cabin from areas around the vehicle frame.

BACKGROUND OF THE INVENTION

The vehicle frame includes multiple components that define various framed cavities within which components of the vehicle are located. Many of these cavities of the vehicle frame are interconnected, such that air flow from one space can move to another. Such spaces of the vehicle frame can also be located within vehicle doors and near operable windows.

SUMMARY OF THE INVENTION

According to one aspect of the present invention, a vehicle door sealing assembly includes a door trim panel and an inner frame panel defining a door cavity. A window is positioned proximate the door trim panel and the inner frame panel. A beltline seal is disposed between the door trim panel and the inner frame panels and is in selective engagement with the window. A leak seal extends between the door trim panel and the beltline seal to divert a flow of air from the door cavity.

According to another aspect of the present invention, a vehicle sealing assembly includes a vehicle frame defining a frame cavity, a vehicle door having a door trim panel and an inner frame panel that define a door cavity in communication with the frame cavity. An operable window is disposed proximate the door cavity and is operable between open and closed positions. A beltline seal is disposed between the door trim panel and the inner frame panel and is in engagement with the operable window in the closed position. A first air leak stopper is disposed proximate a boundary defined between the door trim panel and the inner frame panel to divert a flow of air from within the door cavity.

According to another aspect of the present invention, a vehicle door sealing assembly includes a beltline seal positioned between a door trim panel and an inner frame panel that define a door cavity of a vehicle door. A window is disposed proximate the beltline seal and a leak seal extends between the door trim panel and the beltline seal to divert a flow of air from the door cavity when the beltline seal defines a deformed state.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
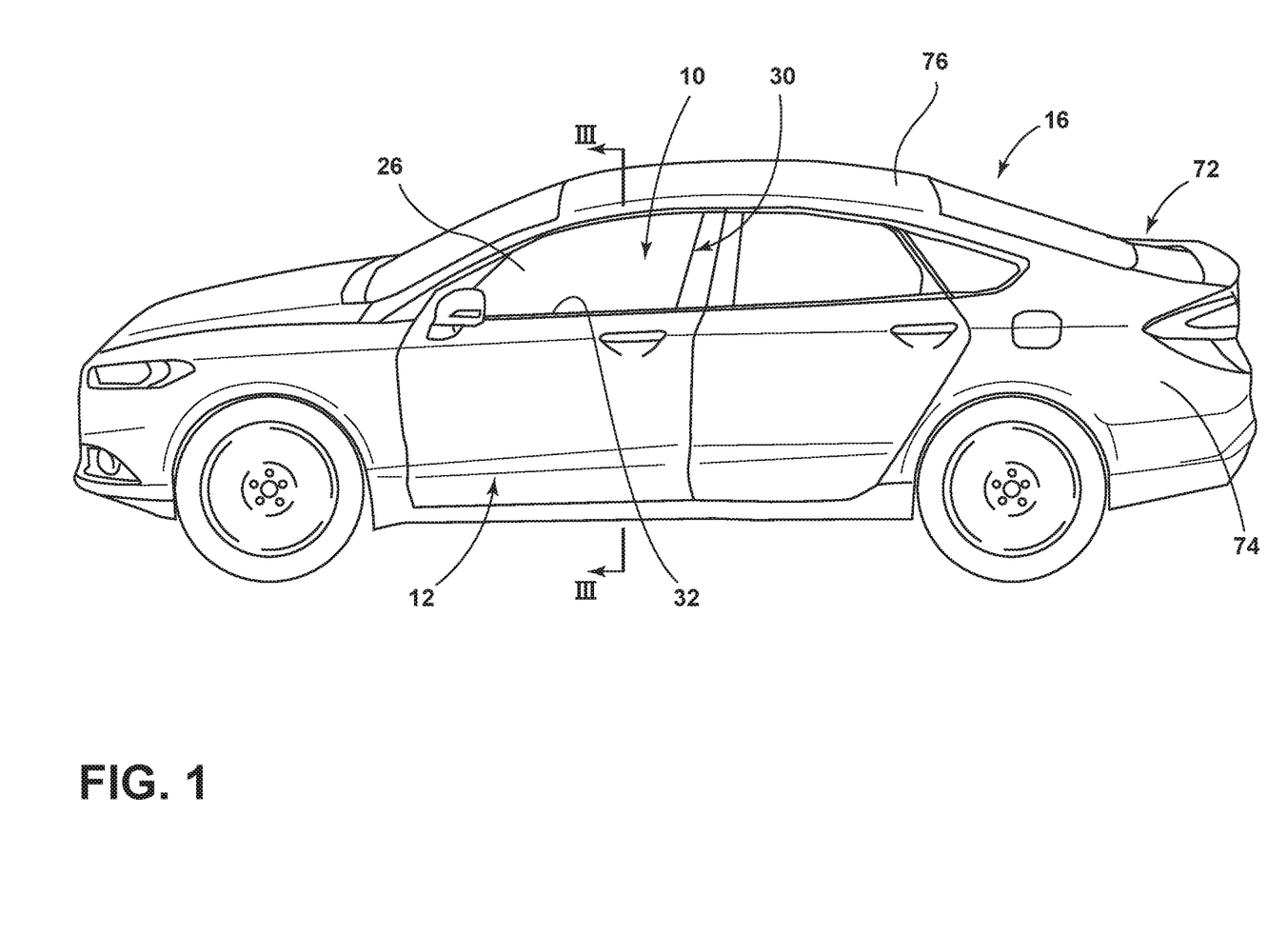
FIG. 1 is a side perspective view of a vehicle incorporating an aspect of a vehicle frame air leak stopper.
Figure 2:
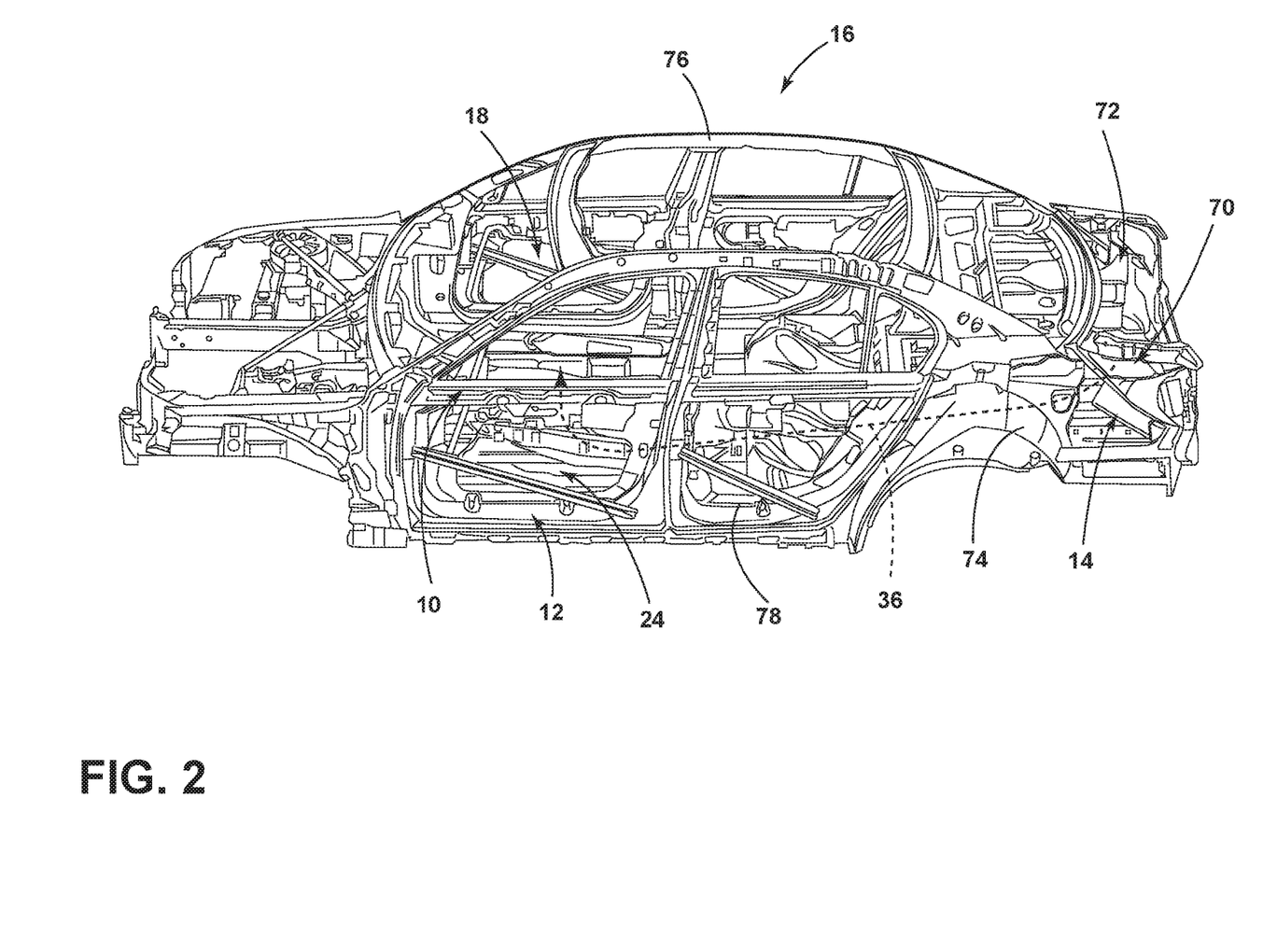
FIG. 2 is a side perspective view of a vehicle frame of the vehicle of FIG. 1 with the outer body panels removed.
Figure 3:
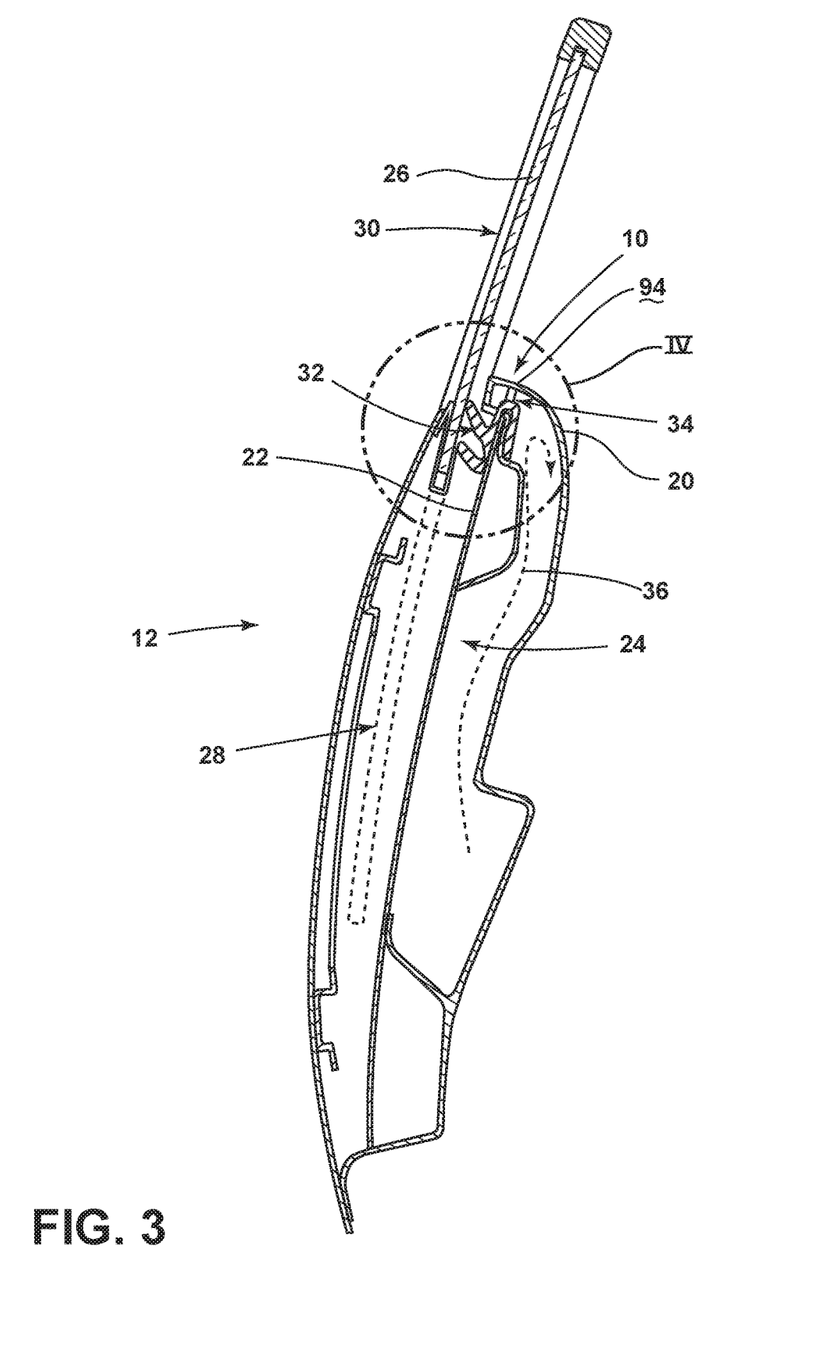
FIG. 3 is a cross-sectional view of a vehicle door of FIG. 1 taken along line III-III.
Figure 4:
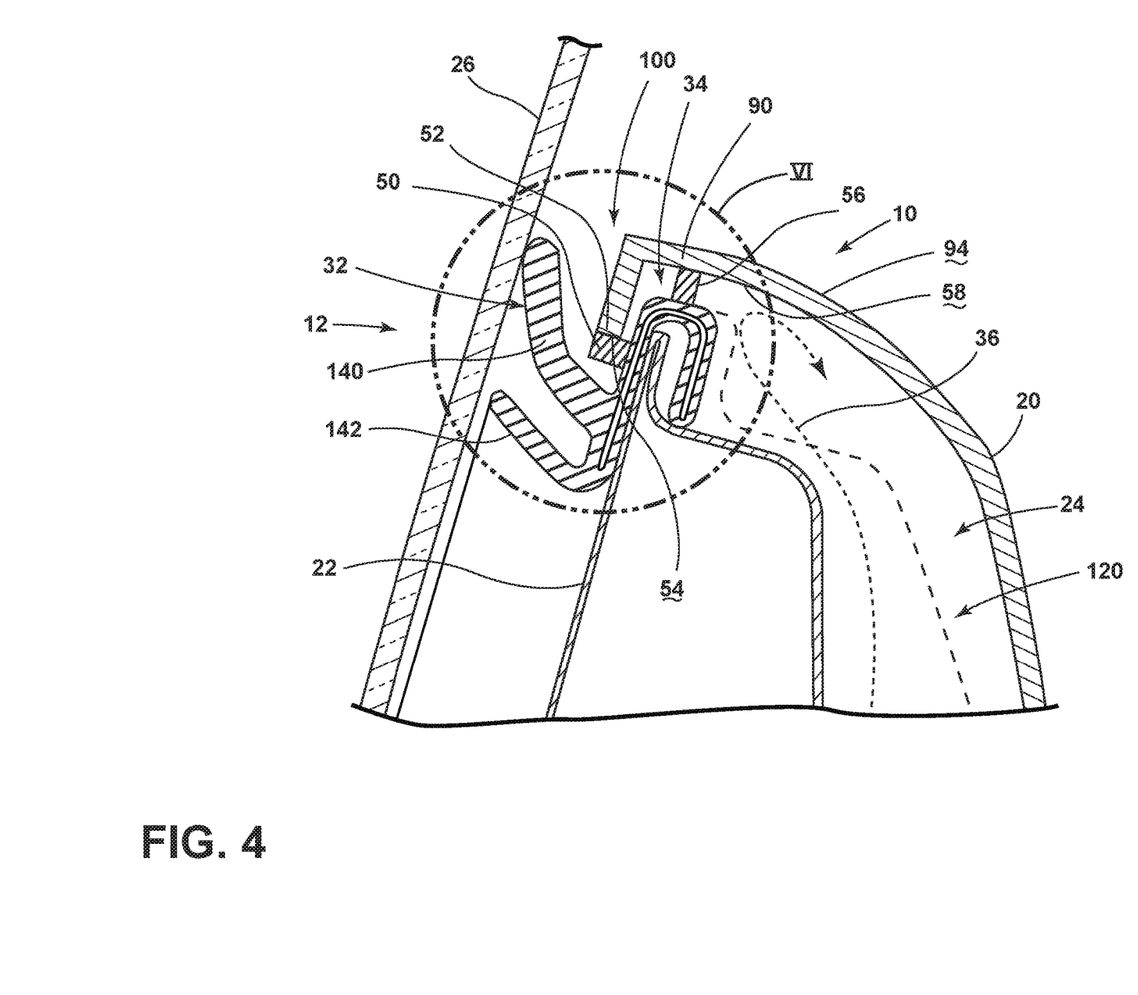
FIG. 4 is an enlarged cross-sectional view of the vehicle door of FIG. 3 taken at area IV.
Figure 5:
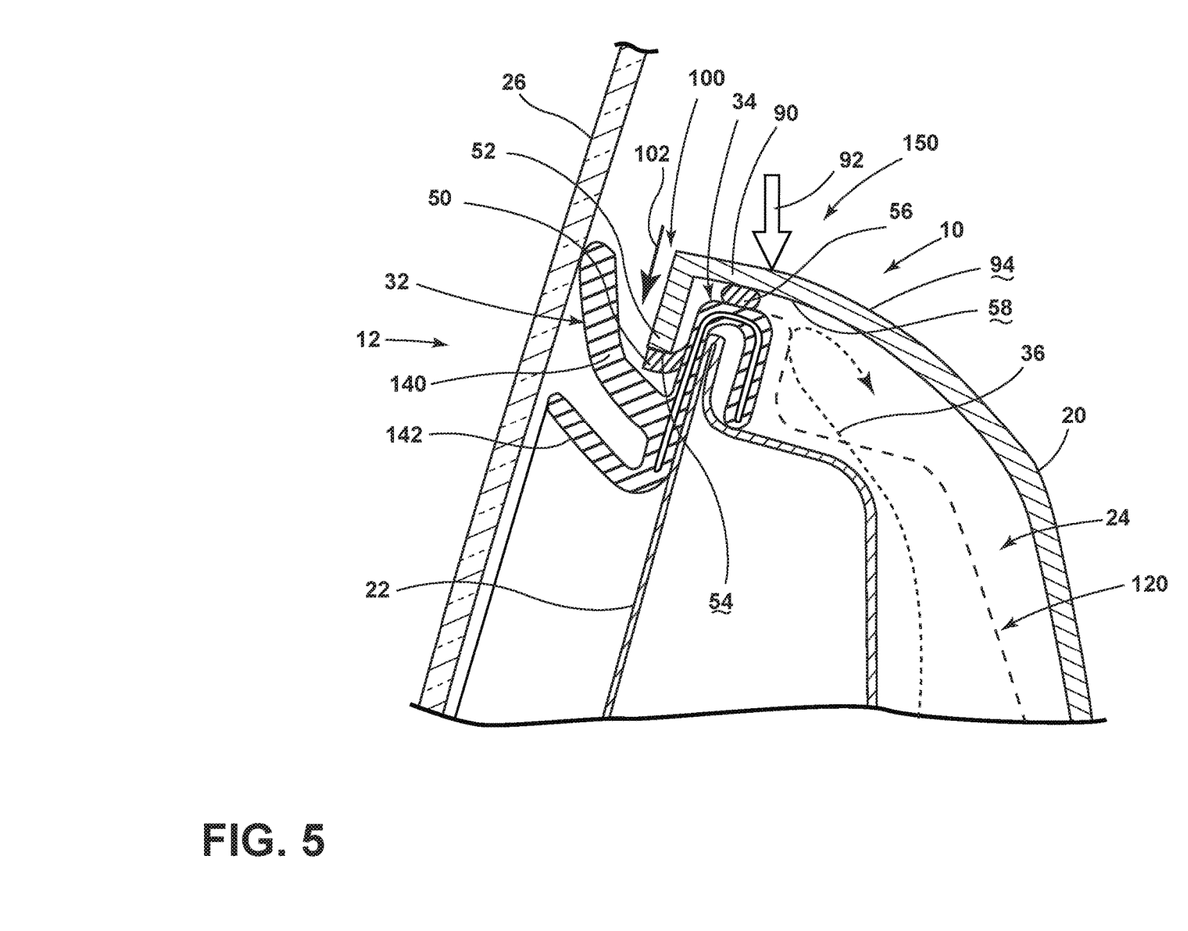
FIG. 5 is a cross-sectional view of the vehicle door of FIG. 4 illustrating a downward force applied to an interior trim panel of the vehicle door.
Figure 6:
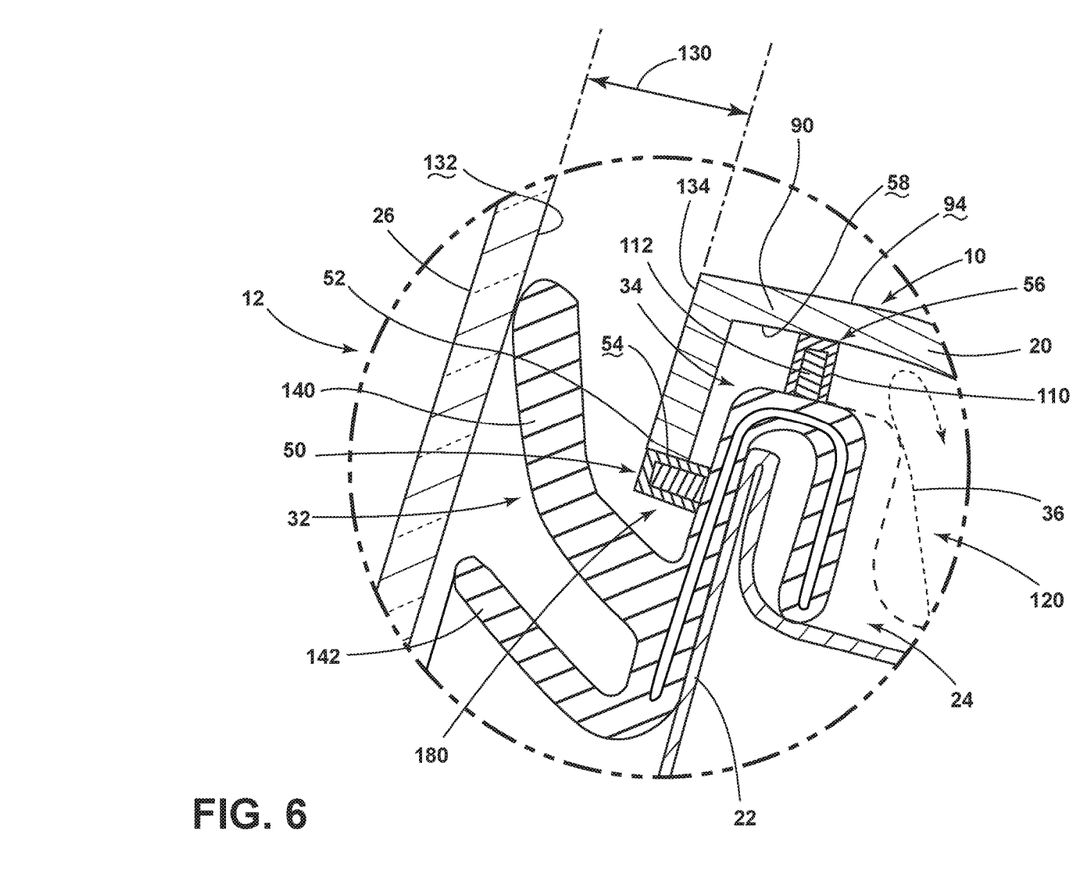
FIG. 6 is an enlarged cross-sectional view of the vehicle door of FIG. 4 taken at area VI.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-6, reference numeral 10 generally refers to a sealing assembly for a vehicular door 12 that is positioned between a frame 14 of the vehicle 16 and a passenger cabin 18 of the vehicle 16. The sealing assembly 10 for the vehicle door 12 can include a door trim panel 20 and an inner frame panel 22 that define a door cavity 24. It is contemplated that the inner frame panel 22 can be a structural portion of the frame 14 of the vehicle 16 disposed within the door 12 of the vehicle 16. A window 26 is positioned proximate the door trim panel 20 and the inner frame panel 22. The window 26 can be vertically operable between open and closed positions 28, 30. A beltline seal 32 is disposed between the door trim panel 20 and the inner frame panel 22 and is in selective engagement with the window 26. The leak seal 34 extends between the door trim panel 20 and the beltline seal 32 to divert a flow of air 36 from the door cavity 24 to substantially prevent the flow of air 36 from the door cavity 24 into the passenger cabin 18 of a vehicle 16.

Referring again to FIGS. 1-6, the leak seal 34 of the sealing assembly 10 can include a first stopper 50 that is disposed at an edge 52 of the door trim panel 20. In such an embodiment, the first stopper 50 can engage the door trim panel 20 at an edge surface 54, where the edge surface 54 substantially defines a thickness of the door trim panel 20. It is also contemplated that the leak seal 34 can include a second stopper 56 that is disposed distal from the edge 52 of the door trim panel 20. As exemplified in FIGS. 1-6, the first stopper 50 can extend substantially horizontally from the portion of the beltline seal 32 to engage the edge surface 54 of the door trim panel 20. The second stopper 56 can be disposed in a generally vertical direction from the beltline seal 32 to engage a substantially horizontal and an inward-facing surface 58 of the door trim panel 20. It should be understood that the leak seal 34 of the sealing assembly 10 can include both the first and second stoppers 50, 56, or can include only one of the first and second stoppers 50, 56, as generally exemplified in FIGS. 3-8.

Referring again to FIGS. 1-6, the door cavity 24 defines a space that is in communication with a frame cavity 70 of the frame 14 of the vehicle 16. The frame cavity 70 can include various portions distal from the door 12 such as areas proximate the trunk 72, quarter panels 74, roof 76, floor 78, and other areas of the frame 14 of the vehicle 16. A flow of air 36 can extend from one portion of the frame cavity 70 to another portion of the frame cavity 70 including, but not limited to, the door cavity 24 defined between the door trim panel 20 and the inner frame panel 22. This flow of air 36 can carry various odors from portions of the vehicle 16 through the frame cavity 70 and into the door cavity 24. Such odors can originate from a spare tire proximate the trunk 72, mechanical portions of the vehicle 16, various seals, and other non-exhaust type odors that, while not necessarily hazardous to the user, may be unpleasant and detract from the driving experience of the user.

Various studies have shown that while a user operates the vehicle 16, a user may place their arm upon a top portion 90 of the inner door trim panel 20 proximate the beltline seal 32 and the window 26. Placing the user's arm upon this portion of the door 12 of the vehicle 16 exerts a downward force 92 upon a top surface 94 of the door trim panel 20. This downward force 92 of the user's arm upon the door trim panel 20 can act to at least partially separate a portion of the door trim panel 20 from the beltline seal 32 and allow for this flow of air 36 to enter the passenger cabin 18 of the vehicle 16 and carry various unpleasant or otherwise unwanted odors into the passenger cabin 18. The inclusion of the sealing assembly 10 of the vehicle door 12 that includes the leak seal 34 made up of at least one of the first and second stoppers 50, 56 serves to prevent this leakage of air from the door cavity 24 and into the passenger cabin 18 when a downward force 92 is exerted in the door trim panel 20.

Referring now to FIGS. 3-6, when the downward force 92 is applied to a top surface 94 of the inner door trim panel 20 of the door 12 of the vehicle 16, the movement of the trim panel 20, as a result of this downward force 92, is generally downward. The first and second stoppers 50, 56 of the leak seal 34 are positioned in engagement with the trim panel 20, such that as the trim panel 20 moves, the engagement between the first and second stoppers 50, 56 and the trim panel 20 is maintained. In this manner, an air seal 100 is maintained between the door cavity 24 and the passenger cabin 18 of the vehicle 16.

Referring again to FIGS. 3-6, it is contemplated that the first stopper 50 that engages the trim panel 20 at an edge surface 54 of the trim panel 20 can resiliently deflect in a bending or twisting-type motion to maintain engagement between the first stopper 50 and trim panel 20. The position of the second stopper 56 is configured to receive the downward movement 102 of the trim panel 20 such that the second stopper 56 is resiliently compressed downward in a biasing fashion to maintain engagement between the first and second stoppers 50, 56 and the inward-facing surface 58 of the trim panel 20. In order to allow for a substantially continual engagement between the first and/or second stoppers 50, 56 and the trim panel 20, the first and second stoppers 50, 56 of the leak seal 34 can be made of a thermoplastic compounded material that is substantially resilient and elastic in configuration. It is contemplated that the first and second stoppers 50, 56 can be separate members that are adhered to portions of the beltline seal 32. It is also contemplated that at least a portion of the first and second stoppers 50, 56 can be formed as part of the beltline seal 32. A foam seal 110 can then be added around the first and second stoppers 50, 56, where desired. In this manner, when a downward force 92 is placed upon the trim panel 20, the first and second stoppers 50, 56 can be biased either in a bending or compressive manner to maintain the seal between the door cavity 24 and the passenger cabin 18 of the vehicle 16. When the downward force 92 is removed, such as when the user removes an arm from the top surface 94 of the trim panel 20, the resilient and elastic nature of the first and second stoppers 50, 56 returns the first and second stoppers 50, 56 to their original state to maintain the engagement between the first and second stoppers 50, 56 with the respective portions of the trim panel 20. It is also contemplated that first and second stoppers 50, 56 can include a foam seal 110 that extends around an inner thermo-plastic or thermoset material that forms a compounded core 112 that further serves to maintain the seal between the first and second stoppers 50, 56 and the trim panel 20 of the door 12 of the vehicle 16.

Referring again to FIGS. 3-6, it is contemplated that the elastic nature of the first and second seals can result in gaps in the seal between the first and second stoppers 50, 56 and the trim panel 20, where pressure within the door cavity 24 exceeds a threshold pressure 120 within the door cavity 24. By way of example, and not limitation, the sealing strength defined by the lock seal 34, a threshold pressure 120 that can be within a range of from approximately one pound per square inch to approximately three pounds per square inch, such that when the internal pressure of the door cavity 24 exceeds this threshold pressure 120, and/or the sealing strength of the leak seal 34, one or both of the first and second stoppers 50, 56 may partially separate from a portion of the trim panel 20 to allow excess pressure to escape from the door cavity 24.

According to the various embodiments, as exemplified in FIGS. 3-6, where the internal pressure of the door cavity 24 exceeds the threshold pressure 120, it is contemplated that various venting mechanisms disposed between the first and second stoppers 50, 56 can be implemented to allow excess pressure from a door cavity 24 to escape into areas other than the passenger compartment of a vehicle 16. In such an embodiment, where the internal pressure of the door cavity 24 exceeds the threshold pressure 120, the second stopper 56 may at least partially separate from the trim panel 20 to release this excess pressure from the door cavity 24. A venting mechanism disposed between the first and second stoppers 50, 56 can allow at least a portion of this excess air flow to be vented to an area distal from the passenger cabin 18. In such a system, the first stopper 50 can substantially maintain a seal between the first stopper 50 and the edge surface 54 of the trim panel 20. It is contemplated that certain situations can result in a greatly excessive internal pressure within the door cavity 24, such as during a collision or impact condition where both the first and second stoppers 50, 56 may be separated from a portion of the trim panel 20.

In addition to maintaining a seal between the beltline seal 32 and the trim panel 20, the use of the leak seal 34 that extends between the door trim panel 20 and the beltline seal 32 can also serve to minimize various dimensional tolerances in areas proximate the operable window 26. It is contemplated that inclusion of at least one of the first and second stoppers 50, 56 can allow for a minimal tolerance distance 130 between the interior surface 132 of the window 26 and the outermost portion 134 of the trim panel 20. Such tolerance distance 130 can be along the order of approximately 5 millimeters. This tolerance distance 130 can be at least partially attributed to the inclusion of the first and second stoppers 50, 56 that divert the flow of air 36 from within the door cavity 24. The beltline seal 32, in turn, can be decreased in size due to the supplemental sealing engagement between the first and/or second stoppers 50, 56 and the trim panel 20. The beltline seal 32, which can include primary and secondary seals 140, 142 that extend between the inner frame panel 22 and the window 26 can be decreased in size. The tolerance distance 130 between the window 26 and the inner frame panel 22 can, in turn, also be diminished.

Referring now to FIGS. 3-8, the sealing assembly 10 for the vehicle door 12 can include the beltline seal 32 that is positioned between the door trim panel 20 and the inner frame panel 22 that cooperate to define the door cavity 24 of the door 12 of the vehicle 16. The window 26 can be positioned proximate the beltline seal 32 and a leak seal 34 extending between the door trim panel 20 and the beltline seal 32 to divert a flow of air 36 from the door cavity 24 when the beltline seal 32 defines a deformed state 150. The deformed state 150 of the beltline seal 32 can be defined when a user places an arm or another part of a body upon a top surface 94 of the trim panel 20 to exert a downward force 92 onto the trim panel 20 that can cause a deformation in the trim panel 20 and the beltline seal 32. As discussed above, the leak seal 34, which can include one or both of the first and second stoppers 50, 56 can maintain a sealed engagement between the beltline seal 32 and the trim panel 20 to divert a flow of air 36 from the door cavity 24 and prevent this flow of air 36 from entering the passenger cabin 18 of the vehicle 16 when the beltline seal 32 is in this deformed state 150.

Figure 7:
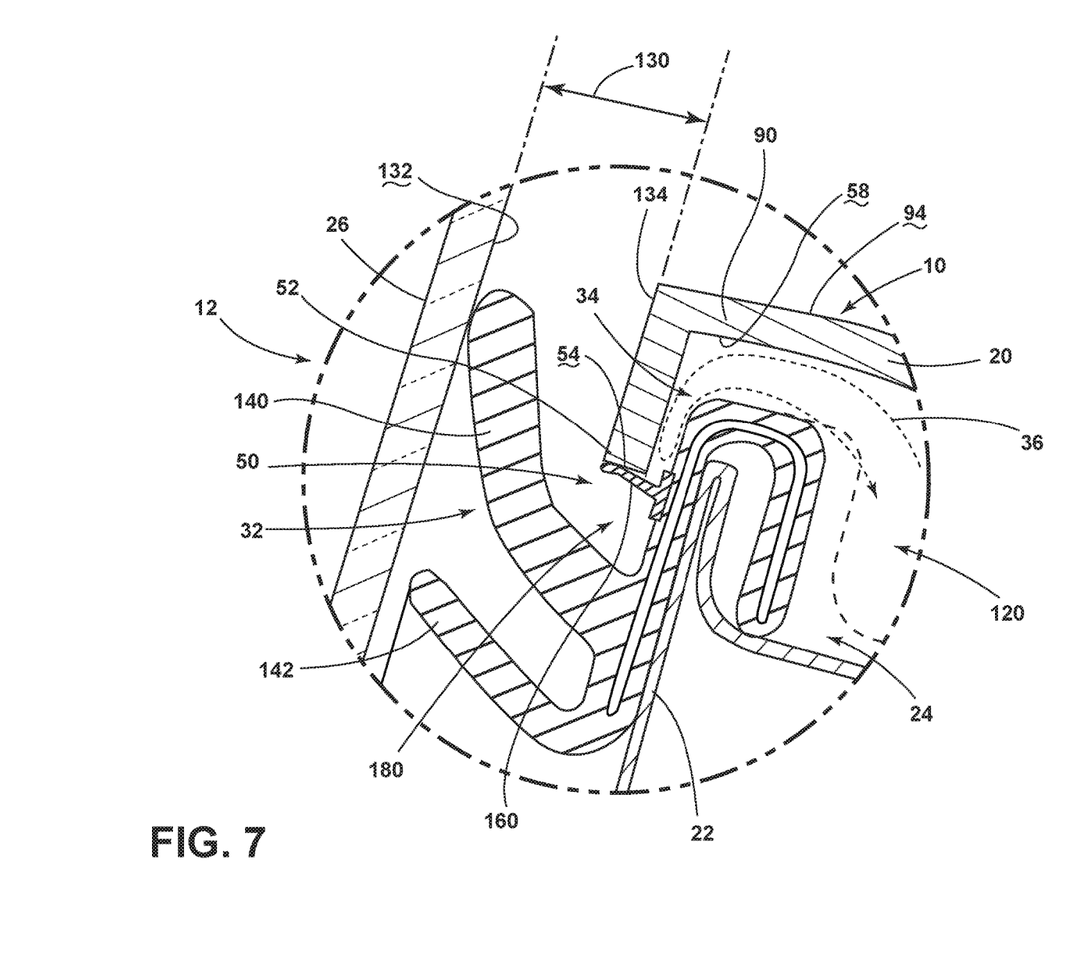
FIG. 7 is a cross-sectional view of an aspect of a door frame air leak stopper.
Figure 8:
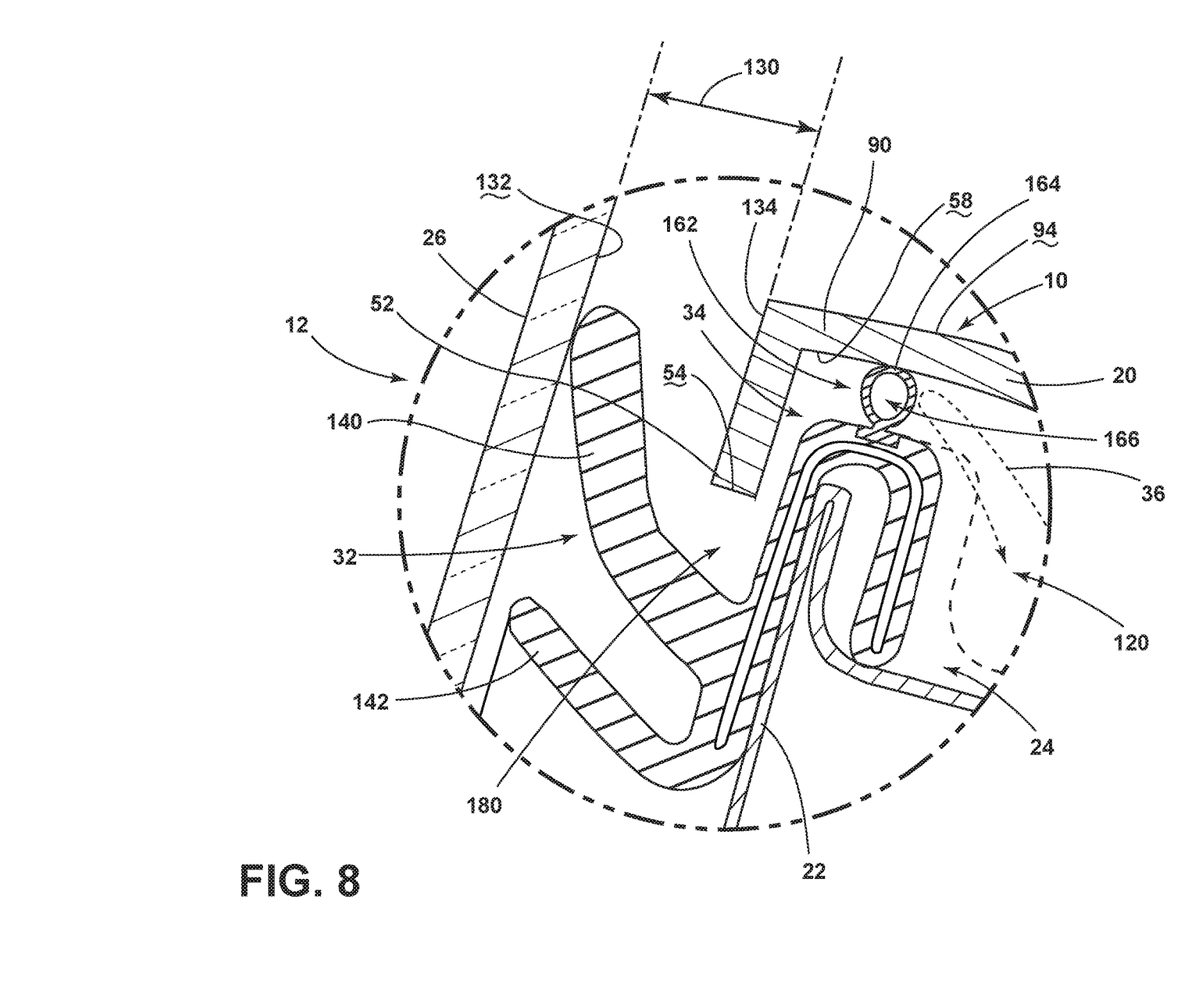
FIG. 8 is a cross-sectional view of another aspect of a vehicle frame air leak stopper incorporated within a vehicle door.

Referring now to FIGS. 7 and 8, the first and/or second stoppers 50, 56 of the leak seal 34 can include a lip-type cross section (exemplified in FIG. 7) where the lip seal 160 is biased toward a portion of the trim panel 20 and deforms with the movement of the trim panel 20 when the downward force 92 is exerted upon the top surface 94 of the trim panel 20. It is also contemplated that at least one of the first and second stoppers 50, 56 of the trim seal can include a bulb-type cross section (exemplified in FIG. 8) where the bulb seal 162 includes a tubular member 164 having a central stopper cavity 166 that extends therethrough. As the downward force 92 is applied to the trim panel 20, the trim panel 20 deflects downward to define the deformed state 150. The bulb seal 162 compresses and serves to maintain the seal between the first and/or second stoppers 50, 56 and the trim panel 20. Both the lip seal 160 and the bulb seal 162 are configured to be elastic and deflect back into an original position when the door trim panel 20 moves back to its original position when the downward force 92 is removed from the top surface 94 of the trim panel 20.

Referring now to FIGS. 1-8, the sealing assembly 10 for the vehicle 16 can include the frame 14 that defines the frame cavity 70. The door 12 of the vehicle 16 includes the trim panel 20 and the inner frame panel 22 that define the door cavity 24, where the door cavity 24 is in communication with the frame cavity 70. The operable window 26 is disposed proximate the door cavity 24 and is operable between the open and closed positions 28, 30. The beltline seal 32 is disposed between the door trim and the inner frame panels 20, 22 and is in engagement with the operable window 26 at least when the window 26 is in the closed position 30. A first stopper 50 or air leak stopper is disposed proximate a boundary 180 defined between the door trim panel 20 and the inner frame panel 22, typically at the beltline seal 32. The first air leak stopper diverts the flow of air 36 from within the door cavity 24 to prevent this flow of air 36 from reaching the passenger compartment of the vehicle 16. The second stopper 56 or air leak stopper can also extend between the door trim panel 20 and the beltline seal 32 to further divert the flow of air 36 from within the door cavity 24 and to further prevent this flow of air 36 from reaching the passenger cabin 18 of the vehicle 16.

According to the various embodiments, the sealing assembly 10 described herein can be disposed proximate various operable windows 26 or openings of the vehicle 16. Such operable windows 26 can include operable windows 26 disposed within side doors, moonroofs, sliding windows, vent windows and other operable portions of a vehicle 16. It is contemplated that the sealing assembly 10 operates when the window 26 is in the open or closed positions 28, 30, or when the window 26 is in a partially open position 28. When a window 26 is cracked open, a vacuum can be created within the passenger cabin 18 that can serve to draw a flow of air 36 from the door cavity 24 and into the passenger cabin 18. As discussed above, the sealing assembly 10, that can include the first and/or second stoppers 50, 56, serves to counteract this vacuum and at least partially limit this flow of air 36 from exiting the door cavity 24 and entering the passenger compartment of a vehicle 16.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle door sealing assembly comprising:
   a door trim panel and an inner frame panel defining a door cavity;
   a window positioned proximate the door trim panel and the inner frame panel, wherein a portion of the door trim panel extends downward to a distal end surface that is located between the window and the inner frame panel and wherein the distal end surface is located below an uppermost top surface of the inner frame panel;
   a beltline seal disposed between the door trim panel and the inner frame panel and in selective engagement with the window; and
   a leak seal extending between the door trim panel and the beltline seal to divert a flow of air from the door cavity, wherein a portion of the leak seal extends from the beltline seal and directly engages the distal end surface of the door trim panel between the window and the inner frame panel.

2. The vehicle door sealing assembly of claim 1, wherein the leak seal includes a first stopper that is disposed to selectively engage the distal end surface of the door trim panel.

3. The vehicle door sealing assembly of claim 1, wherein the leak seal includes a second stopper that is disposed distal from the distal end surface of the door trim panel.

4. The vehicle door sealing assembly of claim 1, wherein the leak seal is made of a thermoplastic compound material.

5. The vehicle door sealing assembly of claim 1, wherein the leak seal has a sealing strength of 1 pound per square inch proximate the beltline seal, wherein the sealing strength is defined by a pressure at which the leak seal disengages the door trim panel.

6. The vehicle door sealing assembly of claim 1, wherein the door cavity is in communication with a frame cavity defined within a portion of a frame of a vehicle.

7. The vehicle door sealing assembly of claim 1, wherein a distance from the window to the door trim panel is no greater than 5 millimeters.

8. The vehicle door sealing assembly of claim 2, wherein the first stopper engages the door trim panel and selectively engages the distal end surface of the door trim panel.

9. The vehicle door sealing assembly of claim 2, wherein the leak seal includes a foam seal.

10. The vehicle door sealing assembly of claim 1, wherein the leak seal includes a bulb-shaped cross section.

11. The vehicle door sealing assembly of claim 1, wherein the leak seal includes a lip-shaped cross section.

\* \* \* \* \*